United States Patent Office 2,927,914
Patented Mar. 8, 1960

2,927,914

CROSSLINKING OF VINYL ETHER POLYMERS WITH IODINE

William A. Hosmer, Lee, Mass., and Albert C. Starke, Jr., Easton, Pa., assignors to General Aniline & Film Corporation, New York, N.Y., a corporation of Delaware No Drawing. Application June 28, 1956
Serial No. 594,344

2 Claims. (Cl. 260—91.1)

The invention here presented is a new and useful process for hardening, insolubilizing and curing water soluble vinyl ether polymers by the use of iodine or iodine compound, by which the water-soluble polymer is rendered water-insoluble, tacky and elastic.

Among the wide range of synthetic polymers, the majority are water-insoluble, and a great many are curable to hard, insoluble, infusible resins of high-strength, hardness and inflexibility. Others are thermoplastic and water-insoluble, but a few are spirit-soluble, some others are elastomers which are water-insoluble as polymerized and are curable to high grade elastomers which likewise are water-insoluble, and some are spirit and hydrocarbon-insoluble; still others, particularly the vinyl ether polymers, are water-soluble and remain water-soluble even though dried down into films.

It is the latter group with which the present invention deals. It is now found that by a treatment with iodine, either as such, or in the form of an iodine compound such as hydriodic acid or iodine-chloride or iodine-bromide, these water-soluble polymers can be converted into water-insoluble polymers which are tacky, rubbery and in addition contain substantial amounts of available or free iodine.

In practicing the invention the water soluble vinyl ethers are first polymerized in the usual way, as by a catalyst with or without mild heating, as for example polymerization in bulk or in solution in hydrocarbon or chlorinated hydrocarbon solvents preferably in the presence of Friedel-Craft type catalysts such as $BF_3$, $TiCl_4$, $GeCl_4$, $AlCl_3$, $GaCl_3$, $SnCl_4$ and the like.

Various of the polymers are water-soluble including polyvinyl methyl ether which is particularly readily water soluble. The polymer is dissolved in suitable solvent, ranging between 1% and 30% of the amount of polymer, of iodine, and treated with the iodine preferably dissolved in methyl alcohol and added to the water solution of the vinyl polymer. Careful mixing gives a homogeneous product, which, after drying, is found to be rubbery, with a substantial amount of residual tackiness, and substantial amounts of free, available, iodine, the amount of available iodine being readily adjusted by variation of the amount originally added to the polymer.

The dry polymer may be prepared by treating it with iodine in the dry and then heating somewhat to complete the reaction. Other spirit solvents may be used for both the polymer and the iodine with equally good results, provided only that the solvent is volatile at a temperature low enough to avoid injury to the cross-linked polymer.

The product has a great many uses and it may be skim-coated on to fabric and used as an antiseptic bandage in which the tackiness of the insolubilized polymer holds the bandage in place, and the free iodine serves as a potent antiseptic and disinfectant, with a minimum of danger from burns and the like, because of low concentration of iodine at the surface of the adhesive. Alternatively the polymer may be used as an adhesive between layers of fabric of any sort such as cloth, rubber, paper, wood and the like, and if the free iodine is removed by steaming or hot vacuum treatment, it makes an excellent adhesive for metals. Also by conducting the reaction in the interstices of a porous fabric such as tape or paper or the like, an excellent adhesive-building material is obtained.

By the process of the invention there is thus obtained a new curing procedure for the soluble polyvinyl ethers, and a new product in the form of a water-insoluble, adhesive, iodine-carrying film. Other objects and details of the invention will be apparent from the following description.

The primary raw material of the present invention is a soluble vinyl ether such as alkyl vinyl ethers, such as vinyl methyl ether, vinyl ethyl ether, vinyl stearyl ether, vinyl aryl ether, such as vinyl phenyl ether, vinyl cycloaliphatic ether, such as vinyl cyclohexyl vinyl ether and vinyl ethers of glycols, alkoxyalkanols and polyalkoxyalkanols. One or more of these vinyl compounds may be polymerized or copolymerized as above indicated to yield a polymer having a molecular weight of approximately K10 to K150 preferably K20 to K70. The resulting polymer is then treated with iodine, either as such or in the form of an iodine compound or acid, preferably iodine and hydriodic acid (fluorine being excluded because of its highly poisonous character, the difficulty of handling and preparing it, and substantial differences in reaction).

The water-soluble polymer and the halogen substance are then combined in any convenient way. The polymer may be dissolved in water or other solvent and the iodine either as such or also dissolved in a suitable solvent, is added to the polymer solution, the two stirred and the solvent then removed as by evaporation. Alternatively the dry polymer may be combined with the anhydrous iodine compound, this being particularly satisfactory with iodine in the solid state, the fairly finely polymerized polymer being ground or tumbled with the iodine until an absorption of the iodine is reasonably complete, whereafter the reaction may be finished by allowing the mixture to stand for a substantial number of days, or by a mild heat treatment.

The resulting polymer is thermoplastic and may be applied to a wide range of carriers by such operations as skim-coating, roll coating and the like, or if the compound is prepared from water or solvent solution, the solution may be coated on to the desired surfaces and the solvent evaporated to leave a residual film of the desired insolubilized or "cured" polymer resulting from the iodine treatment.

The following examples are offered as showing the best way of practicing the invention known at the present time; they are not however intended to restrict the scope of the appended claims:

Example 1

To 5 g. of polyvinyl methyl ether dissolved in 15 g. of water was added 1 g. of iodine dissolved in 8 g. of ethyl alcohol. Mixing gave a homogeneous product. Complete drying at room temperature gave a product which was rubbery and insoluble in water at 5 percent concentration. On standing in water for two weeks, only swelling was noted in the plastic; the aqueous layer colored indicating presence of free iodine.

Example 2

To 25 g. of low viscosity polyvinyl isobutyl ether dissolved in 50 g. of isopropyl alcohol was added 1 g. of iodine. After mixing to a uniform brown-red solution the isopropyl alcohol was removed on a steam-bath using a slight vacuum. The product was dark and rubbery.

Example 3

The antiseptic bandage was prepared by coating a woven cotton fabric with solid polyvinyl ether which was calendered onto the fabric. The calendered fabric was then treated with a solution of iodine in heptane in which the iodine is readily soluble, but the polyvinyl ether is insoluble. Submersion of the bandaged fabric in the heptane solution of iodine for a substantial time interval (overnight, or from 24 to 36 hours) depending upon the thickness of the coating, caused the iodine to diffuse into the polyvinyl methyl ether coating in which a small amount of the iodine combined, while the remainder maintained its diffusable condition for the production of a continuously sterile surface.

Example 4

A similar woven cotton fabric was coated with polyvinyl butyl ether by calendering the polymer on to the fabric, and the fabric was then submerged in an aqueous solution of hydrogen iodide (hydriodic acid). As before, the coating became sticky, rubbery and insoluble.

Example 5

A mixture of chicle, polyvinylbutyl ether and iodine was prepared by mixing the 3 on the double roll mill (rubber mill type of rolls) and this material also was calendered on to a woven cotton fabric upon which it shortly became insoluble, tacky and antiseptic.

Example 6

A mixture was prepared of polyvinyl ether and iodine in a carbonchlorofluoride solvent (Freon). This material was spread on to a variety of wounds, both open cuts, burns and the like, upon which it formed an artificial coagulum which served as an antiseptic protection to the wound, upon which it adhered sufficiently to stay in place, but not so strongly as to be difficult to remove.

Thus the invention provides a new and useful procedure for the hardening and water-insolubilization of water-soluble vinyl ether polymers to produce a new and useful synthetic resonance.

While there are above disclosed but a limited number of processes and products of the present invention it is possible to provide still other embodiments without departing from the inventive concept herein disclosed, and it is therefore desired that only such limitations be imposed upon the appended claims as are stated therein or required by the prior art.

The invention claimed is:

1. The method of rendering water-insoluble a water-soluble homopolymer of methylvinyl ether which comprises adding to an aqueous solution of a homopolymer of methylvinyl ether an amount of elemental iodine equal to about 20% by weight of said homopolymer, thoroughly mixing the same and drying the same whereby there is obtained a rubbery water-insoluble homopolymer of methylvinyl ether containing iodine.

2. A rubbery water-insoluble composition comprising a homopolymer of a water-soluble methylvinyl ether combined with about 20% by weight of said homopolymer of iodine when prepared by the process as defined in claim 1.

References Cited in the file of this patent

UNITED STATES PATENTS

| | | |
|---|---|---|
| 2,291,574 | Gleason et al. | July 28, 1942 |
| 2,581,927 | Briant | Jan. 8, 1952 |
| 2,616,879 | Zoss | Nov. 4, 1952 |
| 2,752,281 | Niederhauser | June 26, 1956 |

FOREIGN PATENTS

| | | |
|---|---|---|
| 645,067 | Great Britain | Oct. 25, 1950 |

OTHER REFERENCES

Eley et al.; Trans. Faraday Soc., No. 317 (1948), pages 425–436 (pages 429 and 431 only needed). (Copy in Pat. Off. Sci. Lib.)

Eley et al.; J. Chem. Soc. (1954), pages 1668–1672 (pages 1670 and 1671 only needed). (Copy in Pat. Off. Sci. Lib.)